United States Patent [19]

Smith et al.

[11] 4,030,352

[45] June 21, 1977

[54] APPARATUS FOR REPRODUCING OPERATING CONDITIONS IN INDUCED FLOW DEVICES

[75] Inventors: Richard L. Smith, Livonia; Peter J. Mosher, Northville, both of Mich.

[73] Assignee: Scans Associates, Inc., Livonia, Mich.

[22] Filed: Jan. 12, 1976

[21] Appl. No.: 648,510

Related U.S. Application Data

[62] Division of Ser. No. 483,320, June 25, 1974, Pat. No. 3,975,953.

[52] U.S. Cl. .............................................. 73/118
[51] Int. Cl.[2] .......................................... G01F 9/00
[58] Field of Search ...................... 73/118; 74/393; 318/685

[56] References Cited

UNITED STATES PATENTS

| | | | |
|---|---|---|---|
| 3,524,344 | 8/1970 | Converse et al. .................... | 73/118 |
| 3,528,080 | 9/1970 | Greene et al. ....................... | 73/118 |
| 3,604,254 | 9/1971 | Sabuda .............................. | 73/118 |

*Primary Examiner*—Jerry W. Myracle
*Attorney, Agent, or Firm*—Dolgorukov & Dolgorukov

[57] ABSTRACT

This invention relates to a method and apparatus for reproducing operating conditions in induced flow devices, such as carburetors and the like, and more particularly to a system for reproducing such operating conditions which may be used in testing systems designed to test induced flow devices.

In operation in such a test system, the apparatus of the present invention would cause a given air flow to flow through an induced flow device such as a carburetor, and then would cause the throttle plate of the carburetor to be rotated until the desired manifold vacuum in the carburetor is obtained, at which time the test of the carburetor could take place. By providing a throttle drive controller to move the carburetor throttle at a speed which is proportional to the difference in the manifold vacuum actually present in the carburetor, and the desired manifold vacuum, a very rapid movement of the throttle plate between test points can be had, but at the same time a slow approach to the actual test point, to prevent overshoot, is accomplished.

A continuous monitoring of the difference between the manifold vacuum in the carburetor, and the desired manifold vacuum, is accomplished by a continuous reading and comparing of electrical signals, in either a manual or computer controlled system, in which the two signals are first compared to determine which way the carburetor throttle must be moved to approach the desired test point, and then the actual difference between the two signals is computed to determine how many additional pulses must be supplied to the stepping motor forming part of the carburetor throttle drive controller to control the drive as described above.

The operations reproducing system of the present invention works equally as well computer or manually controlled, or with sonic or subsonic air flow measuring devices.

6 Claims, 18 Drawing Figures

Fig-9
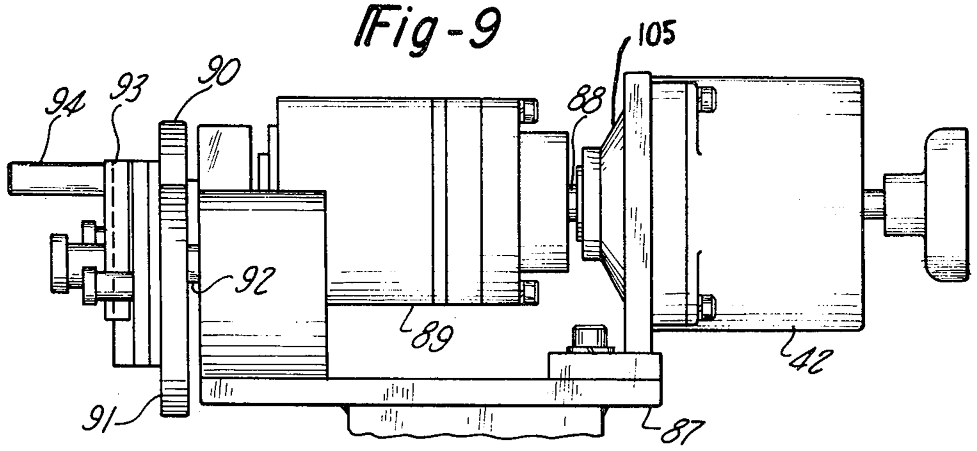
Fig-10
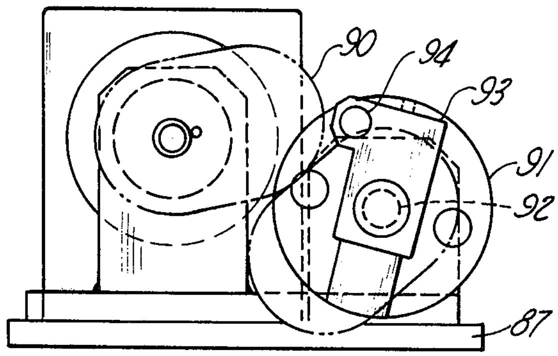
Fig-11
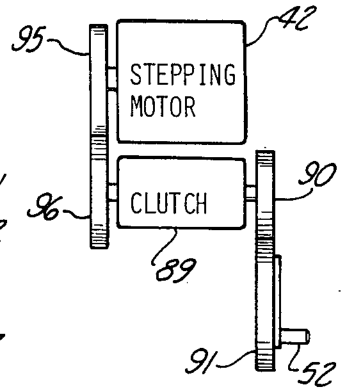
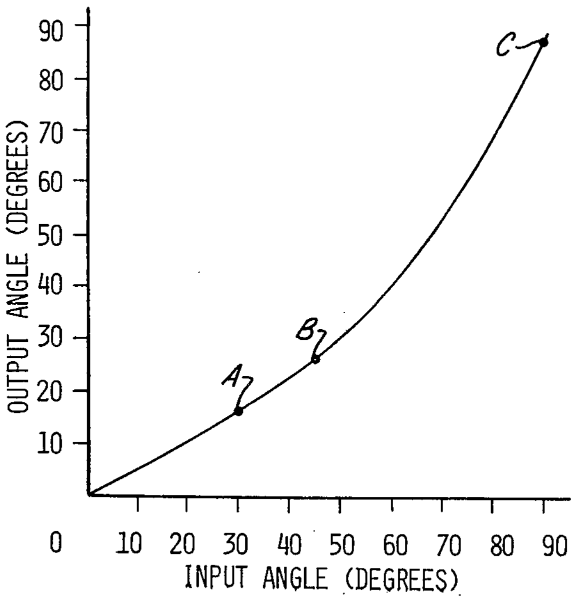
Fig-12

APPARATUS FOR REPRODUCING OPERATING CONDITIONS IN INDUCED FLOW DEVICES

The present application is a division of U.S. Pat. application Ser. No. 483,320, filed on June 25, 1974, now U.S. Pat. No. 3,975,953 in the names of Richard L. Smith and Peter J. Mosher.

This invention relates to a method and apparatus for reproducing operating conditions in variable induced flow devices, and more particularly to a method and apparatus for reproducing a predetermined air flow and manifold vacuum through a carburetor in a carburetor testing system.

Applicants have for many years been engaged in the production of carburetor tests stands and the like for testing carburetors to determine if they meet ever stricter standards for air pollution. Applicants started in the carburetor testing field many years ago when the only test there was for a carburetor was to determine the fuel/air ratio at idle conditions, and if such fuel/air ratio was in the neighborhood of plus or minus as much as 6 – 9 percent of the ideal fuel/air ratio, the carburetor was passed for installation in the motor vehicle, with the assumption that it would perform properly in the finished automobile.

At this early stage of the art, even though each carburetor on the production line was tested, it was tested more with a view to making sure that the air and fuel actually flowed through the carburetor, rather than for accuracy. In other words, the carburetor was just tested to see if it would work on an automobile engine before it was installed thereon.

As need for some type of standards became felt, there was still no actual testing for accuracy done on the production line, but only a comparison of the fuel/air ratio of a production carburetor with the fuel/air ratio of a carburetor known to work well on an automobile engine. The carburetor which was known to work well would be tested under what is known as laboratory conditions. The tests made in accordance with such laboratory methods were exceedingly slow, were limited to laboratory equipment and conditions, were not continuous, and were not susceptible of being made a production operation.

Such conditions were due to the fact that the ratios for each carburetor had to be determined by direct measurements of the fuel drawn by the carburetor during a measured time period at a given flow of air. In order to produce a definite and controlled flow of air at that point in the art, such flow had to be of a subsonic nature controlled by a suitable valve, and the measurements of fuel flow had to be made directly, such as by measuring the volume of fuel consumed from a graduated glass container.

The carburetor known to work well on the automobile engine would be tested according to these laboratory methods to determine its fuel/air ratio. The tested carburetor would then be carried to the production line and become the standard to which the production carburetors would be held. This then was the first testing for accuracy of carburetors on the production line.

As the concern over air pollution became greater, and the need for greater accuracy in each and every carburetor coming off the production line became felt, the testing of the fuel/air ratio of each and every carburetor coming off the production line at an accuracy of that rivaling the laboratory method of carburetor testing became essential, and obviously new methods of carburetor testing for the production line were needed.

By the time that testing of a carburetor was more or less standardized, and testing took place at four points or more of the operation range of the carburetor the most common ones being idle, off-idle, part throttle, and wide open throttle, Applicants' assignee was a leading manufacturer in the test equipment field, and patented the carburetor testing system disclosed in the U.S. Pat. No. 3,517,552 to Vernon G. Converse III, et al. This system was completely satisfactory for the production rates required of carburetor testing systems at the time Applicants3 assignee produced such a system, and such a system is still produced for use where production rates are relatively low and accuracy requirements permit its use. However, Applicants were soon required by ever increasing standards of accuracy and ever higher rates of production to continue to improve on the above mentioned carburetor testing system. While four or more points of testing were maintained as standard, it was desired to complete the carburetor test at least two or three times faster than such a system could perform the test.

It should be restated at this point, as disclosed in the above mentioned patent, the carburetor requirements are given in terms of fuel/air ratio permitted at certain engine manifold vacuums, and that basically a carburetor testing system must produce a given air flow through the carburetor and then have a system which will adjust the carburetor throttle plate to produce a specified manifold vacuum, at which time the fuel flow through the carburetor is measured. From these values the fuel/air ratio is computed for the particular point in the carburetor's operating range.

It can be seen that the great variable feature in the carburetor testing system is not a measurement of fuel flow, as this can be done with any number of flow measuring devices presently available in the art, nor is it the measurement of a given air flow through the carburetor, as this can be done by any number of devices such as critical venturi meters, variable area critical venturi meters, laminar flow tubes or subsonic nozzles, but it is the adjusting of the carburetor throttle plate to reproduce the predetermined specified manifold vacuum given by the carburetor manufacturer. While the U.S. Pat. No. 3,517,552 discloses a pneumatic carburetor throttle positioner which was and still is satisfactory for carburetor testing lines with relatively low rates of production and accuracy requirements, it is not satisfactory in some of today's current high production carburetor test lines. Therefore, in an attempt to solve the problem of how to more quickly reproduce a required manifold vacuum, we focused our attention the part of the operations reproducing system which controlled the carburetor throttle.

It should be understood that in performing a test on an induced flow device such as a carburetor or the like, not only is it critical to maintaining high production rates that the test at each point of the operation range be performed quickly, but also that the carburetor throttle be moved from one test point to the next test point quickly and accurately. While the pneumatic throttle positioner may move between test points quickly, the time it takes to produce the required manifold vacuum once it gets approximately to the right throttle opening, under the worst conditions is approximately 30 seconds, while the present invention, as will be discussed later, cuts this time better than 50 percent, which is a significant advance in the art.

After much work, an electrical system providing two speeds of movement of the carburetor throttle was devised, wherein the carburetor throttle was no longer moved by a pneumatic cylinder, but was driven by electrical stepping motors which could be driven at two rates of speed. The carburetor throttle would be driven at a faster rate of speed when going between test points, and slow rate of speed when approaching a test point, so that its overshoot would be at a minimum. However, such a system was still not entirely satisfactory, as the system, in order to have adequate resolution at low flow conditions such as idle, even at the higher rate of speed would take a relatively great length of time to move between test points, and furthermore would approach such test points at a single rate of speed tending to make overshooting such test points a common occurence, and increasing the time the system would hunt for the proper value. Even though such electrical throttle positioners could be controlled by a computer as disclosed in U.S. Pat. No. 3,524,344, and such a disclosed system was faster than the previously mentioned pneumatic system, relatively little time saving was gained in the time necessary to set the manifold vacuum.

With the advent of stricter and stricter standards for accuracy, coupled with higher and higher production requirements, we felt the necessity for, and have now invented a faster, more accurate and more dependable means to reproduce a predetermined desired vacuum in any induced flow device, such as a carburetor, which requires it.

Therefore, one of the objects of the present invention is to provide an improved method and apparatus for reproducing conditions in induced flow devices, such as carburetors, whereby the above difficulties and disadvantages will be overcome and largely eliminated.

Another object of the invention is to provide an improved method and apparatus for reproducing predetermined manifold vacuums in carburetor testing systems or the like, wherein the carburetor throttle plate can be quickly moved from one point of operation range of the carburetor to another.

Another object of the invention is to provide that such movement of the carburetor throttle between test points is controlled electrically.

A further object of the invention is to provide an improved method and apparatus for reproducing operating conditions in a carburetor testing system, whereby the carburetor throttle plate can be moved quickly between test points, and as the carburetor throttle plate approaches a test point, the movement of the throttle plate becomes proportional to the difference between the manifold vacuum in the carburetor and the desired manifold vacuum.

A still further object of the present invention is to produce a throttle setting device of the nature specified in the preceding paragraph, whereby the throttle setting system is computer controlled.

A still further object of the present invention is to provide an improved method and apparatus for reproducing vacuums, and thus inducing flow, in any devices which depend on the presence of vacuum to induce flow therein.

Another object of the present invention is to provide an improved flow control system which is self-contained in operation, which is suitable for a production environment, can be placed on a test stand to be operated by a production worker, and which does not require for its operation the service of a skilled laboratory technician.

A further object of the present invention is to provide an improved method and apparatus for reproducing vacuums in vacuum induced flow devices which will operate equally as well with sonic or subsonic flow devices.

A still further object of the present invention is to provide an improved carburetor throttle drive having a stepping motor, wherein the amount the carburetor throttle moves per degree of movement of the stepping motor becomes greater the further away you move from the idle position of the carburetor.

A still further object of the present invention is to provide a carburetor throttle drive as described in the preceding paragraph, wherein such movement is induced by the movement of elliptical gears.

It is still another object of the present invention to provide a carburetor throttle drive of the foregoing nature which is adaptable to computer control and useful in carburetor testing systems.

It is an additional object of the present invention to provide a carburetor throttle drive which has faster operation than previously available, has a non-linear mechanical advantage, and which has proportional control to reduce the amount of hunting as you approach a test point.

Further objects and advantages of this invention will be apparent from the following description and appended claims, reference being had to the accompanying drawings forming a part of this specification; wherein like reference characters designate corresponding parts in the several views:

Figure 3:
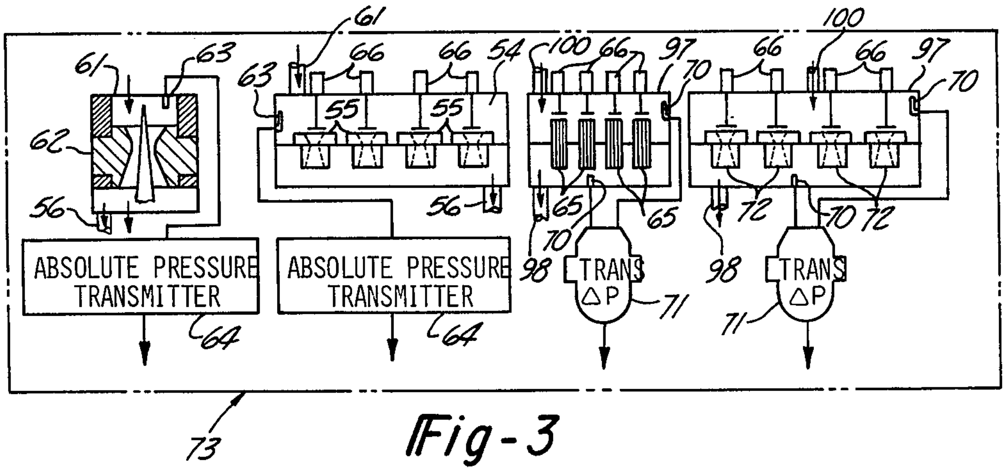

FIG. 3 is a diagrammatic view showing four types of flow producing devices which may be used in the present invention, i.e., a variable area critical venturi meter in combination with an absolute pressure transmitter, critical venturi meters in combination with an absolute pressure transmitter, laminar flow tubes in combination with a differential pressure transmitter, or subsonic nozzles in combination with a differential pressure transmitter.

Figure 4:
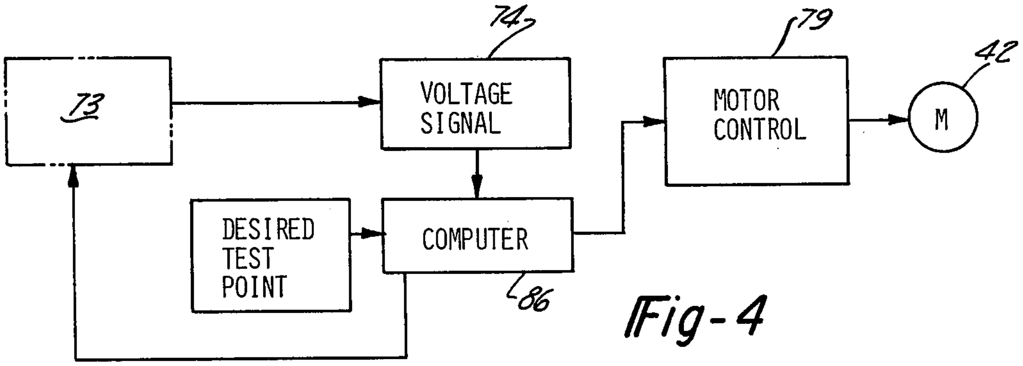

FIG. 4 is a diagrammatic view of a one system embodying the present invention.

Figure 5:
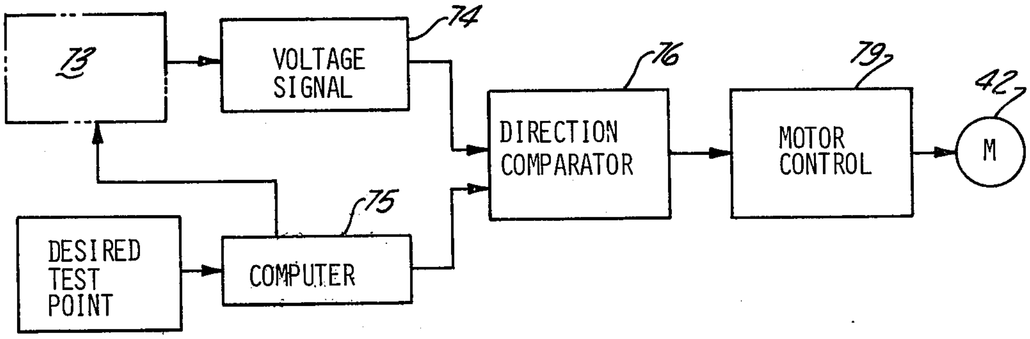

FIG. 5 is a diagrammatic view of a basic system embodying the present invention.

Figure 6:
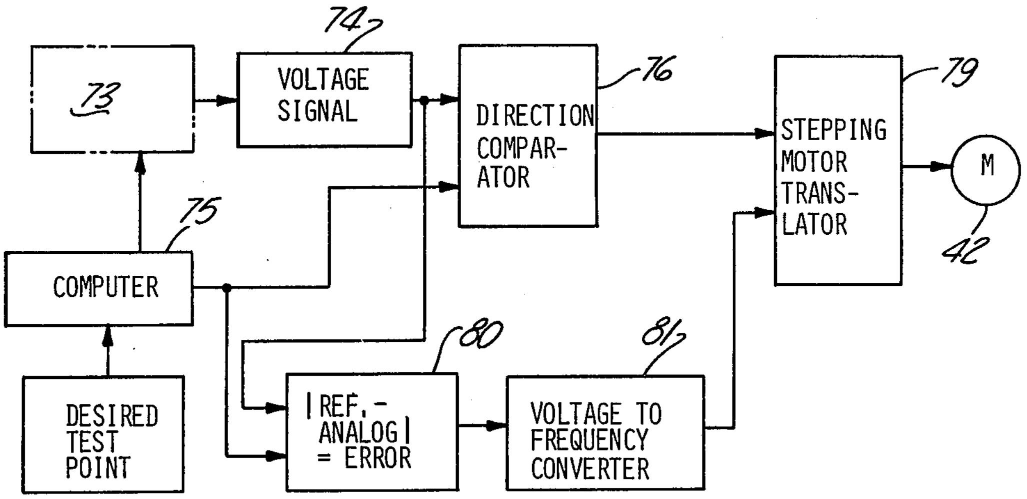

FIG. 6 is a diagrammatic view of a construction embodying the present invention, and including an error calculator and a voltage to frequency converter.

Figure 7:
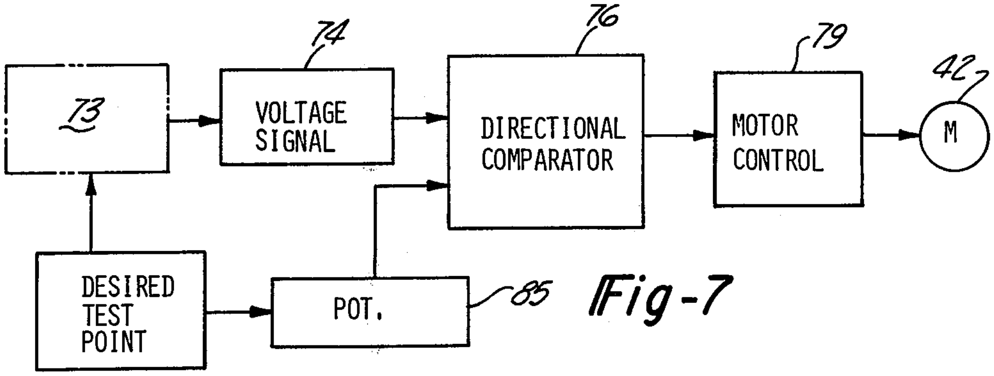

FIG. 7 is a diagrammatic view of the construction shown in FIG. 5, as it may be modified for manual operation.

Figure 8:
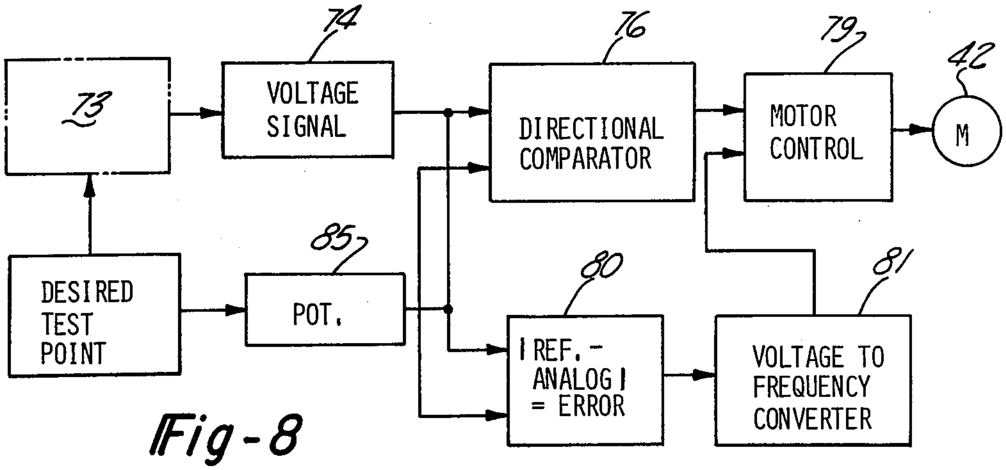

FIG. 8 is a diagrammatic view of the construction shown in FIG. 6, as it may be modified for manual operation.

FIG. 9 is an elevational view of our improved carburetor throttle drive controller.

FIG. 10 is an end view of the construction shown in FIG. 9.

FIG. 11 is a plan view of a modified version of the construction shown in FIG. 9.

FIG. 12 is a graph showing a relation between the degrees of carburetor throttle plate movement versus the degrees of stepping motor movement for any of the constructions shown in FIGS. 9-11.

Figure 13:
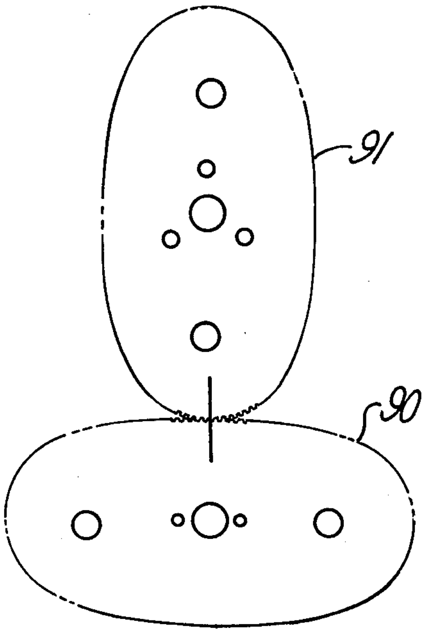

FIG. 13 is an elevational view of the elliptical gears used in the construction of FIG. 9, at their starting or closed throttle position.

Figure 14:
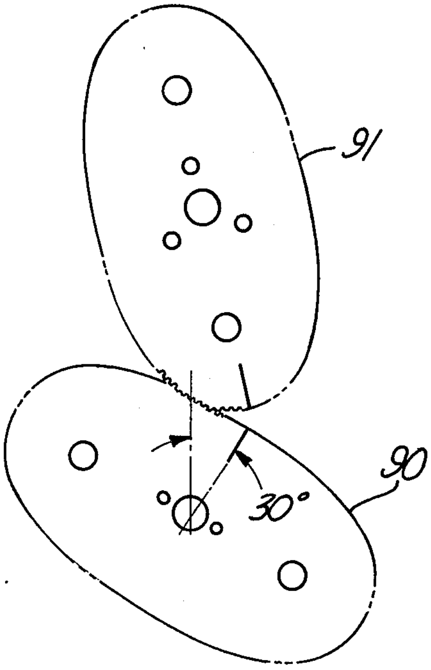

FIG. 14 is a elevational view of the gears shown in FIG. 13 at an off-idle position, and showing that the gear connected to the throttle plate has undergone a smaller angular change in position than the gear connected to the stepping motor.

Figure 15:
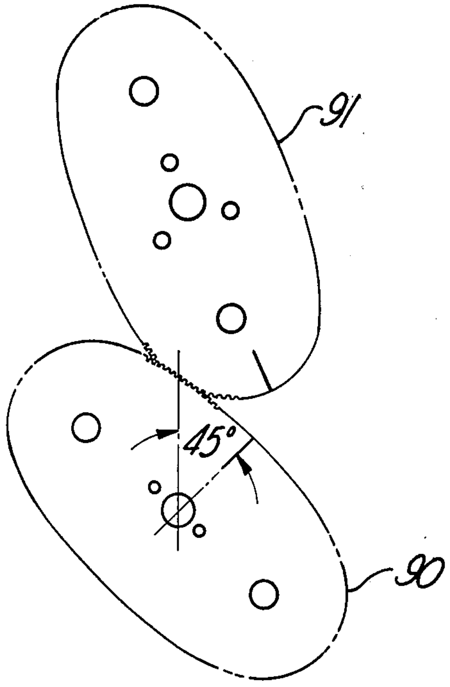

FIG. 15 is yet another view of the gears shown in FIGS. 13 and 14, showing that the rate of angular change of the gear connected to the throttle plate continues to increase at a rate faster than the change in position of the stepping motor gear, as can be seen by the graph of FIG. 12.

Figure 16:
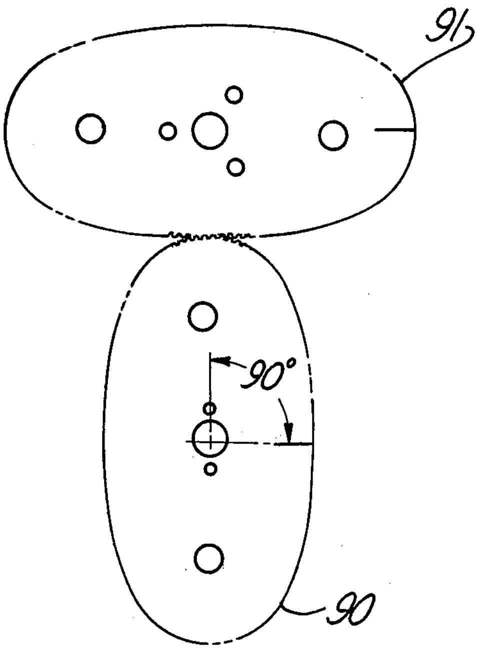

FIG. 16 shows the gears of FIGS. 13–15 in their fully rotated position, wherein the carburetor throttle would be at its wide open or 90° position.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description, and not of limitation.

Figure 1:
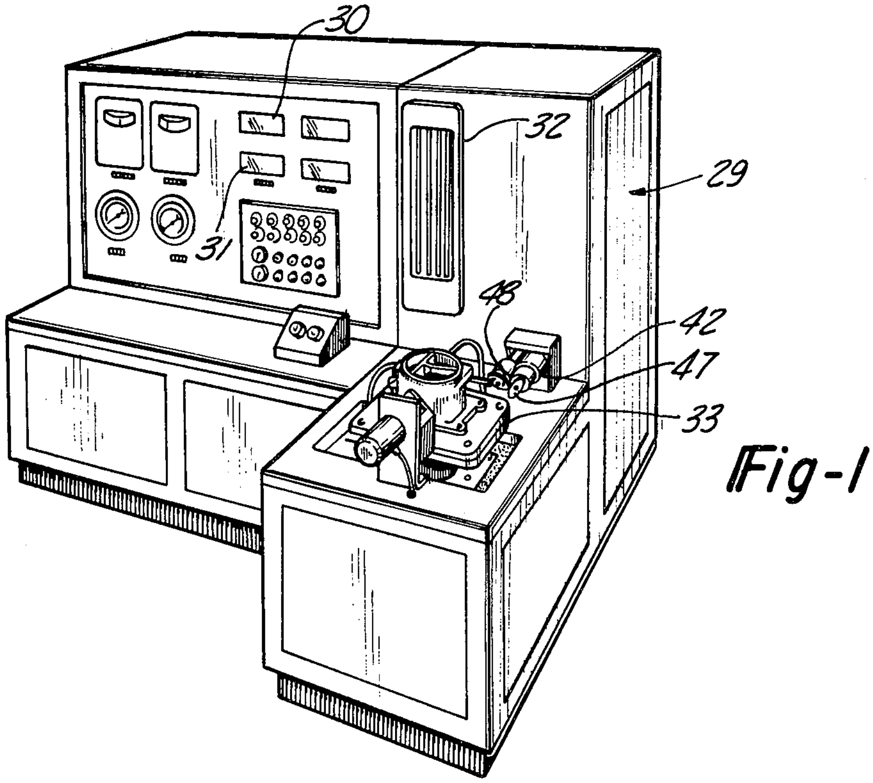
FIG. 1 is a perspective view of a carburetor test stand adapted to test carburetors at several points of their operation range, and which embodies the method and apparatus of the present invention.

There is shown in FIG. 1 by way of a general example, one of the uses that Applicants' flow control system may be put to, i.e., that of use in one of Applicants' own carburetor test stands. In this case, the stand shown is adapted for use in a room having a controlled environment so that the mass flow rate of air though the carburetor will not be affected by temperature, and no compensation need be made therefor. Such stands may have components such as a meter 30 showing the air flow through the carburetor, a meter 31 showing the fuel/air ratio through the carburetor during the test, manometer tubes 32 for calibrating the test stand, and various other indicating devices and switches depending upon the requirements set by the carburetor manufacturer.

Figure 2:
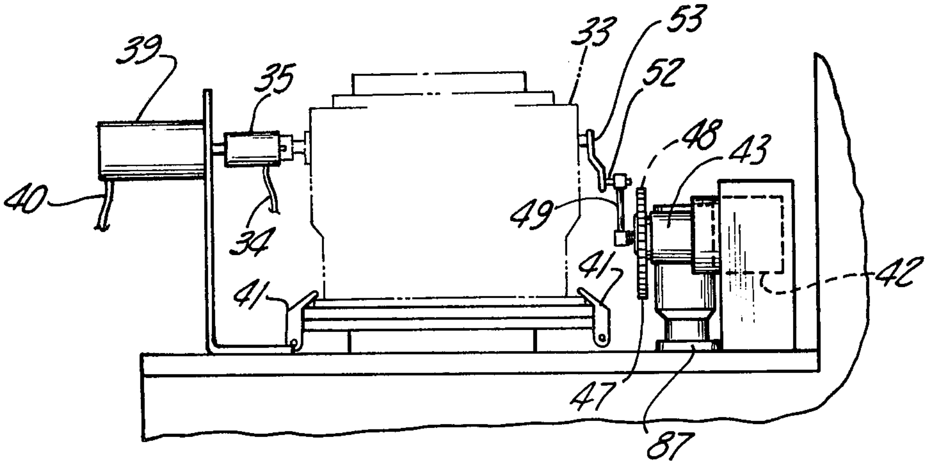
FIG. 2 is a cut away elevational view of a portion of FIG. 1, showing the carburetor which is being tested, and more particularly showing one embodiment of our improved carburetor throttle drive.

Of particular interest in this application, as shown in FIG. 2, is the mounting of the carburetor 33 itself, and the items surrounding it. Shown on the test stand is a means of automatically connecting a fuel source to the carburetor 33 in preparation for a test. The fuel is fed to the carburetor through a conduit 34 which is connected to the test carburetor 33 with the aid of a spring pressed coupling 35 which is securely held in place during the test by a solenoid 39 supplied with electric current through the wire 40. Suitable clamping hooks 41 hold the carburetor sealingly to the top of the test chamber. The carburetor throttle drive, to be more fully explained later, consists of a stepping motor 42 drivingly connected to a clutch 43 by a pair of spur gears (not shown). Driven by the clutch 43 is a pair of identical elliptical gears 47 and 48.

Mounted on the elliptical gear 48 is a spring pressed crank 49 which carries a stud 52. By virtue of such construction, very rapid connection of the carburetor throttle to the throttle drive is accomplished. Once the carburetor is mounted on top of the chamber 54, a basic carburetor test is ready to begin.

It should be understood that the carburetor test can be performed using both sonic and subsonic air flow measurement, and that the present invention will work equally well to set the proper manifold vacuum and air flow under either condition.

In the sonic system, which is the system to which most of the discussion herein will be directed, due to the fact that it is the most convenient and most widely used, the sequence of events in reproducing operating conditions in the carburetor involved choosing the test point you wish to reproduce, supplying the specified air flow at the test point by means of a variable area critical venturi meter or critical venturi meter, and then turning the carburetor throttle until the desired vacuum is achieved.

This control of the carburetor throttle is achieved by sensing the absolute pressure downstream of the throttle plate, by means of an absolute pressure transmitter supplying an analog signal which is constantly compared with a reference signal, the throttle being rotated, as described hereafter until the analog signal equals the reference signal.

A related set of signals is compared in the system wherein subsonic flow is measured, but in this case, the manifold vacuum is preset with the carburetor throttle closed, and then the carburetor throttle is opened until the desired air flow is achieved as indicated by a differential pressure transmitter placed across the flow measuring devices placed upstream of the carburetor, such as laminar flow tubes 65, or subsonic nozzles 77.

All the operations in the system using sonic flow which are performed with the absolute pressure signal to control the rotation of the throttle plate to reproduce a desired vacuum are now performed with the differential pressure signal to control the throttle plate to achieve a desired air flow after the manifold vacuum has been preset.

As will be described, the same proportional control of the throttle plate in response to the difference between a desired air flow and the actual air flow is available in the system with subsonic flow, as is available in the sonic system where the air flow is preset and the throttle control is in proportion to the difference in the actual vacuum and the desired vacuum.

Figure 2A:
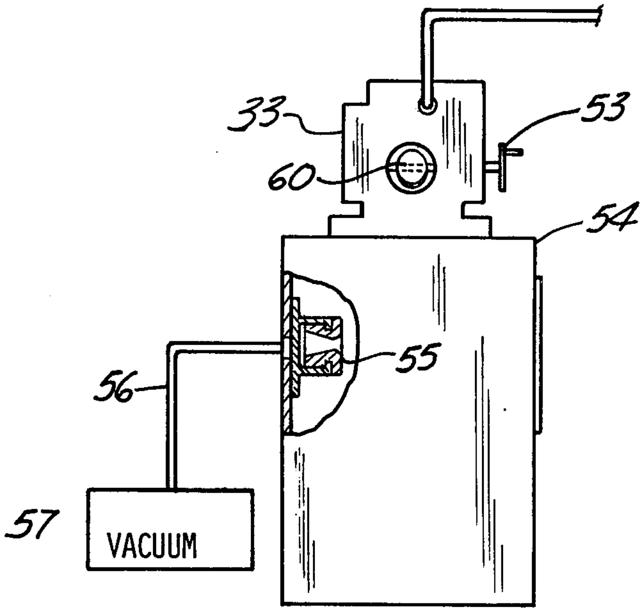
FIG. 2A is a cut-away diagrammatic view of a basic carburetor testing bench using sonic flow measuring devices.

Shown in FIG. 2A is a basic sonic flow carburetor test set up with the carburetor 33 sealingly mounted to the top of a chamber 54. Inside the chamber 54 is illustrated a single critical venturi meter 55 connected by means of the conduit 56 to a source of vacuum 57. In the simplified illustration shown of testing a carburetor at a single test point in which you are required to set a single flow and a single vacuum, the vacuum source 57 would be selected to be large enough to make the venturi meter operate critically, that is at sonic air speeds. In that condition, for a given upstream pressure you would have a definite mass flow rate, such as for example four pounds per minute. Having a definite air flow, the carburetor throttle plate 60 would be rotated by the throttle linkage 53 in the manner previously described until the desired manifold vacuum is achieved. Means of sealingly mounting the critcal venturi meter 55 into the test chamber 54 are disclosed in U.S. Pat. No. 3,517,552, the disclosure of which is incorporated herein by reference.

To test the carburetor at more than one point, several critical venturi meters would be needed, such as illustrated by the diagrammatic view shown in FIG. 3, wherein the chamber 54 is shown containing four critical venturi meters 55, with the flow from carburetor 33 being represented by the inlet 61. As disclosed in U.S. Pat. No. 3,524,344, a single variable area critical venturi meter 62 can replace the four critical venturi meters 55.

Since using either a variable area critical venturi meter or a critical venturi meter means that sonic flow is being used in the system of Applicants' invention, the absolute pressure upstream of the venturi meter equals the vacuum present in the carburetor, and thus, changes in the vacuum are indicated by changes in the absolute pressure, which are sensed by the pressure probe 63, and are transmitted for use in the remainder of the system by the absolute pressure transmitter 64.

If the use of subsonic flow is desired in the system, either due to the particular carburetor being tested, the cost involved, or the fact that it is an item different from a carburetor that is being tested, the vacuum would be preset with the carburetor throttle closed by utilizing the signals received from the differential pressure transmitter 101 connected to the pressure probes 102.

Since subsonic flow is being used, the signals which are utilized in the control of the throttle plate are the ones indicating air flow.

Figure 2B:
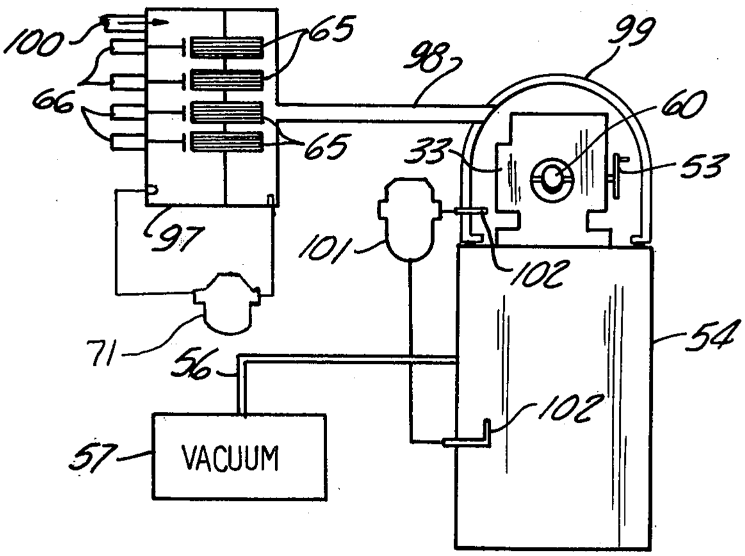
FIG. 2B is a cut-away diagrammatic view of a basic carburetor testing bench using sub-sonic flow devices placed upstream of the carburetor.

The flow measuring devices are placed upstream of the carburetor in chamber 97 as shown in FIG. 2B. Air enters the chamber 97 through the inlet 100, passes through the laminar flow tubes 65, through the conduit 98 into the carburetor hood 99, and then through the carburetor 33.

If subsonic flow is being used, the differential pressure across the laminar flow tubes determines the flow rate. To determine the change in flow rate, the change in the differential pressure is needed. This is supplied by readings taken by the pressure probes 70 which are connected to the differential pressure transmitter 71. These in turn are used in Applicants' system described below.

Another modification of Applicants' system can be the substitution of subsonic nozzles 72, again selected by the valves 66, with the differential pressure again being sensed by the probes 70, being calculated and transmitted by the differential pressure transmitter 71.

It should be understood that any one of these four systems or others can be used, and Applicants' flow control system will work equally well with any of them. For the purposes of ease of description. Applicant will refer to the block shown in FIG. 3 as the flow measuring system 73, and when the numeral 73 is used it should be understood to mean that any of the four systems illustrated in FIG. 3 could be placed in the block 73 and used in Applicants' system.

To find the manifold vacuum which will be used for setting the throttle plate position, in a sonic flow measurement system the manifold vacuum will be the difference between the controlled room and the pressure measured by the absolute pressure transmitter 64.

In a subsonic flow measuring system the manifold vacuum is preset and is the difference between the pressure in the hood 99 and the pressure in the chamber 54.

Referring to FIG. 6, in operation, the sonic flow measuring system 73 supplies, through the absolute pressure transmitter 64, a voltage signal corresponding to manifold vacuum and is represented by the numeral 74, to the direction comparator 75. Such direction comparators may be such as the type 19-501made by the Bell & Howell Company, and in any event are well known in the art and need not be described herein in detail.

Previous to this event happening, the desired test points have been determined. Usually the desired test points for the carburetor are the previously mentioned idle, off idle, part throttle and full throttle points of operation, and the carburetor manufacturer has supplied for each of these points an air flow and a fuel flow at a predetermined manifold vacuum for each test point. The testing system has to duplicate the manifold vacuum, the given air flow, and measure the fuel flow which results through the carburetor, and compare such fuel flow with the design value to see if the carburetor is acceptable.

Since we are concerned here only with duplicating the required manifold vacuum and air flow, the rest of the test system will not be described in detail.

Having the manifold vacuum and air flow for each test point, the computer operator will, through a suitable computer program, feed this information into the mini-computer 75. Such mini-computers are well known in the art, and neither the computer, or the computer program need be described in detail herein, as they are well able to be duplicated by those skilled in the art. An example of a computer which may be used in the present invention is the Model PDP-11, manufactured by the Digital Equipment Corporation of Maynard, Massachusetts. Once this information is programmed into the computer, the computer will do two things. It will determine the setting of the variable area critical venturi meter 62, if such a meter is being used, which will produce the desired air flow at a particular test point. If a series of critical venturi meters 55 are being used, the computer will determine and open the proper critical venturi meters for the desired air flow. Similarly, if laminar flow tubes 65, or subsonic nozzles 72 are being used, the proper combination of these will be selected.

Once this is accomplished, the computer will supply a reference voltage signal 74 corresponding to the desired manifold vacuum. It should be understood that in a system such as Applicants', the absolute pressure transmitter 64, or the differential pressure transmitter 101, indicates the pressure reading by sending out a signal which is proportional to the pressure being sensed by the pressure probe 63, if absolute pressure is being measured, or the pressure probes 102 if differential pressure is being measured.

For purposes of illustration, usng sonic flow measuring conditions, assume that a manufacturer's specificaton for a particular carburetor is that it should flow 0.2pounds of fuel per hour at nineteen inches of vacuum at an air flow of 2.0pounds per hour. In a controlled room, nineteen inches of vacuum will correspond to 10-½ inches of Mercury (Hg) absolute, and for this reading, the absolute pressure transmitter should supply a reading of two volts D.C. At the starting point, of course, the absolute pressure transmitter 64 will be reading atmospheric pressure, which equals approximately 30½inches of Mercury, and will be giving a signal equal to 5volts D.C.

Before proceeding further, it should be understood that the systems illustrated in this application are for use in a room where the environment is controlled to a constant temperature and pressure, and, therefore, there is no need to adjust the pressure readings for the effect of a change in temperature or pressure. However, if the carburetor testing is to take place in an environment wherein temperatures fluctuate over a wide range, it is obvious that temperature probes could be placed upstream of the flow measurement devices wherein temperature would be taken into account in the calculation of the mass flow rate. The use of such a temperature probe is well within the scope of Applicants'invention.

Continuing with the present illustration, opening the critical venturi meter to the point to produce an air mass flow rate of 2.0 pounds per hour immediately causes a large drop in the pressure sensed by the pressure probes 63. In this case the pressure will drop to 10 inches Hg absolute, and the absolute pressure transmitter, which may be one such as the Series 1331 pressure transducer produced by the Rosemount Engineering Co., of Minneapolis, Minnesota, will give a voltage reading of 1.66 volts, instead of the five volts previously shown. This voltage signal 74 will be fed into the direction comparator 76. In the direction comparator 76, the reading of 1.66volts, which is in the form of an analog voltage signal, will be compared with the reference voltage supplied by the computer 75. It will be recalled that the computer supplied a reference voltage of two volts D.C. corresponding to the desired manifold vacuum of 10.5inches Hg absolute. Since the analog signal is lower than the reference voltage signal, this means that the carburetor throttle must be opened, so the direction comparator will supply a signal to the stepping motor translator (motor control) 79. Such stepping motor translator may be such as type STM 1800,manufactured by the Superior Electric Company of Bristol, Connecticut.

The stepping motor 42 is connected to the carburetor 33 by way of the linkage 53 as previously described. The stepping motor will then begin opening the carburetor throttle plate, resulting in a decrease in the manifold vacuum simultaneously with the further opening of the throttle plate. The absolute pressure transmitter will immediately begin sending a new voltage signal to the diection comparator. If the motor control 79 were to have the stepping motor 42 open the carburetor throttle approximately 3° and then compare the voltage signal with the reference signal, one would find that the analog voltage signal from the pressure transducer would equal about 1.90volts, instead of the previous 1.66volts, or, in other words, the carburetor throttle will be approaching closer to the desired position. In actuality, in the smple system shown in FIG. 5, the direction comparator can only give the motor control a signal to open or close the throttle, and the motor control drives the stepping motor 42 at a uniform rate of speed, while the reference and analog voltages are being constantly compared. When the reference and analog voltages are equal, the direction comparator 76 will send a signal to the motor control 79 to stop the stepping motor 42, at which point the carburetor test will take place. The flow control system just described and illustrated is an excellent system and is used in applications where the volume requirements are relatively low, and provides a speedy and accurate way of reproducing a desired air flow and manifold vacuum through a carburetor. However, we were not happy with its performance on high volume carburetor testing stands because the single speed of the stepping motor still took much longer than desired to travel between carburetor test points. Therefore, we sought a way to speed up travel between test points, and thus, increase the production of our test stands.

In order to achieve this increase in speeds, we chose to have the stepping motor speeds proportional to the error in the system. By error, we wish it understood that this means the absolute value of the difference present at any given time in the values of the reference voltage supplied by the computer 75 and the analog voltage signal supplied by the pressure transmitter 64. In other words, the absolute value of the reference voltage, minus the analog voltage, equals the error. Referring to FIG. 6, it can be seen that the additional equipment required to make this type of system work takes the form of an error calculator, which is in actuality an adder-subtractor which may be of the type 301 manufactured by the Bell and Howell Corporation and referred to by the numeral 80, and a voltage to frequency converter 81. Such voltage to frequency converters are well known in the art and need not be described herein detail. A voltage to frequency converter suitable for our purposes may be the type 19-212 voltage to frequency modules manufactured by the Bell and Howell Corporation.

For purposes of illustration, let us assume that we still wish a carburetor to flow 0.2pounds of fuel per hour at 19 inches of vacuum, which equals 10-½inches Hg absolute. In this situation, the computer 75 will supply a reference signal of two volts D.C. to the direction comparator 76. Again, at the start of the test, the absolute pressure transducer 64 will supply a voltage signal 74 of five volts D.C. to the direction comparator 76.

The computer again will supply the appropriate signal to cause an air flow of two pounds per hour to flow through the carburetor 33. At this point, the absolute pressure transducer 64 will be supplying an analog signal of five volts to the direction comparator 76. Immediately upon opening the variable area critical venturi meter 62 to permit air to flow through the carburetor, the absolute pressure takes a large drop to about 10 inches Hg absolute, at which time an analog voltage signal of 1.66voltes is supplied to the direction comparator 76. Since the reference voltage is higher than the analog signal, we must increase the flow and open the carburetor throttle plate. The directon comparator 76 therefore will supply a signal to the motor control 79 causing the stepping motor 42 to open the carburetor throttle plate. Simultaneously, with the stepping motor beginning to open the throttle plate, the error between the analog and the reference signal is computed. In this case the absolute value of the analog signal, 1.66,minus the reference signal 20, equals 0.34volts. This 0.34volt error is fed into the voltage to frequency converter 81.

As will be exlplained later, the voltage to frequency converter 81 is available in a wide range of values. For puropses of illustration we have chosen to show a voltage to frequency converter with an output of 1,000to 1,or in other words, the 0.34volts is changed to pulses of a frequency of 340Hz, or working at a smaller unit of time, the voltage to frequency converter will put out 34pulses in 1/10of a second. These 34pulses are immediately fed to the stepping motor translator 79 which then immediately turns the carburetor throttle, in this case 0.09° per pulse, or 3° for the 34pulses. This 3° movement of the carburetor throttle plate is many times faster than the previous signal speed system shown in FIG. 5, and, therefore, saves much time in going between test points.

This three degree movement of the throttle plate causes the flow through the carburetor to increase, which increases the absolute pressure to 10.4inches Hg absolute, compared to the 10inches Hg absolute previously this in turn changes the analog voltage being supplied by the absolute pressure transducer 64 to 1.90volts.

Since this is a continuous process, this voltage again goes into the direction comparator where the error is again computed by the error calculator 80. Since the reference voltage is still greater than the analog voltage, the direction comparator again gives a signal to open the carburetor throttle further. This signal is supplied to the stepping motor translator 79, and in turn to the stepping motor 42. Again, simultaneously, the error is computed, in this case, the absolute value of the reference voltage, 2.00, minus the analog voltage, 1.90, equals 10 volts. This is converted to a 100 Hz output by the voltage to frequency converter 81. Again viewing a small amount of time, in 1/10 of a second 10 pulses are supplied to the stepping motor 42 by the stepping motor translator 79, to open the throttle 0.9 degrees more.

Again, this increases the mass flow rate through the flow controller 73, which increases the absolute pressure therein to 10.55 inches Hg absolute, and changes the voltage supplied by the absolute pressure transmitter to 2.05 volts. The voltage signal of 2.05 volts is again supplied to the direction comparator 76, which in this instance finds the analog voltage greater than the reference voltage, and directs the stepping motor translator 79 to direct the stepping motor 42 to close the carburetor throttle by way of the throttle linkage 53. Simultaneously with the operation of the direction comparator, the error calculator 80 computes the absolute value of the reference voltage minus the analog voltage. In this case the value is 0.05 volts, which is changed to a 50 Hz output by the voltage to frequency converter 81. Viewing our .10 second time span, in this amount of time five pulses will be supplied to the stepping motor translator 79, which in turn directs the stepping motor 42 to close the throttle plate 60 of the carburetor 0.45° by way of the carburetor linkage 53. In this case, since we are closing the carburetor throttle plate, the mass flow rate through the flow controller 73 and the absolute pressure therein are reduced, which reduces the voltage signal 74 supplied by the absolute pressure transmitter 64 to 10.49 inches Hg absolute.

It can be seen by the example up to this point, that initially when the carburetor test started and the carburetor started on its way to the first test point, the movement of the throttle plate 60 was very fast, but that as it comes closer and closer to the desired test point, the movement of the throttle plate is slower in proportion to the error. This feature of our invention gives us the best possible advantage in locating test points, in that during most of the travel between test points the carburetor throttle plate 60 will be moved very quickly, but as it approaches the test point it will slow down, so as not to completely overshoot the test point and bring about a hunting condition, where the throttle plate continuously overshoots its desired setting in both directions, but never reaches it, such as could occur with the system as shown in FIG. 5.

In fact, by choosing the ratio of the voltage to frequency converter 81 carefully, for instance by choosing a much smaller conversion ratio, for example 10 to 1, we would approach the desired manifold vacuum very slowly, and never overshoot it. The conversion ratio of the voltage to frequency converter 81 is chosen for each particular carburetor model to be tested.

To continue with our example, the absolute pressure of 10.49 inches Hg absolute which is present after the carburetor throttle 60 was closed 0.45°, causes a voltage signal 74 to be sent by the absolute pressure transmitter 64 to the direction comparator 76. This voltage signal has a value of 1.99 volts D.C. The direction comparator will see that the reference voltage is now again larger than the analog voltage. The direction comparator 76 will supply a signal to the stepping motor translator 79, (motor control) and thus, to the stepping motor 42, to open the carburetor throttle plate 60 by way of the throttle linkage 53. Again, simultaneously, the error calculator 80 calculates the error as 0.10 volt D.C., and the voltage to frequency converter 81 converts this to a 10 Hz output. Again, in a 1/10th of a second, one pulse is supplied to the stepping motor translator, which opens the carburetor throttle linkage in the manner previously described, an additional 0.09 degrees. This additional opening of the carburetor throttle plate 60 again increases the mass flow rate through the flow controller 73, which increases the pressure therein to 10.5 inches Hg, which has an analog voltage of 2 volts D.C.

Since the analog voltage now equals the reference voltage, the direction comparator 76 supplies a signal to the stepping motor translator 79 to open the carburetor throttle further. However, since the error is now zero, no pulses are supplied to the stepping motor translator 79, and the carburetor throttle remains steady, having arrived at the point where the desired manifold vacuum is supplied. We have thus invented a computer operated operations reproducing system in which the speed of change of the carburetor throttle plate during its travel between test points is initially very fast, much faster than the older pneumatic or electrical systems, but which is slowed down as it approaches the test point in proportion to error, therefore, the test points are obtained quickly, with a minimum of overshoot, and very little hunting.

Whereas in the old pneumatic systems previously described, to get a known manifold vacuum to occur at a certain throttle plate position, say 70°, there might be thirty seconds or so to hunt for the proper test point, due to the fact that the old pneumatic throttle positioners were only single speed devices operating in a very slow manner. Even the old electric operations reproducing system, which had two speeds at which the throttle could be operated, was not much better than the pneumatic system, while our new system, with the variable speed computer controlled throttle positioner, will arrive at a test point in as much as 50% less time.

Our improved system could even be operated manually if this was desired for some reason. Referring to FIG. 7, the only difference between the system illustrated therein and the system shown in FIG. 5 which was previously described, is that a manually operated potentiometer 85 will take the place of the computer 75. In this case the operator would set the reference voltage of two volts on the potentiometer, and would manually set the flow controller 73 to the desired air flow. From then on the operation of the system would be identical with that described for FIG. 5 for the system in which the stepping motor translator 79 would control the stepping motor 42 at a single speed.

A manually operated system in which there is proportional control of the stepping motor 42, is shown in FIG. 8. Again, the operator would manually set the reference voltage of two volts on the potentiometer 85, and manually set the desired flow through the flow controller 73.

If desired, the proportional flow control system in FIG. 6 can be simplified as shown in FIG. 4. In this instance a computer 86 would be used to perform the functions of not only supplying the reference voltage and setting the desired flow through the flow controller 73, but would also take over the functions of the error calculator 80 and the voltage to frequency converter 81.

In any of the systems shown in FIGS. 4–8, the stepping motor has so far been assumed to be a standard stepping motor directly connected to the carburetor linkage 53. However, it can be seen that in any of the systems, travel between test points could be faster if in addition to the proportional control provided by Applicants' system, a mechanical advantage from the stepping motor itself could be had. In other words, the opening of the carburetor throttle linkage would not be of a uniform amount for each degree of rotation of the stepping motor. However, deciding where the mechanical advantage should be had, and the designing of a throttle drive mechanism to produce such a mechanical advantage, presented problems of major proportions. At very low carburetor air flows, such as at idle and off idle, very fine resolution must be had. In other words, very close control of the throttle plate must be had, and no additional advantage over Applicants' proportional control of the stepping motor is needed. However, due to the nature of the carburetor, the part-throttle and full throttle test points require much less resolution but much more turning of the throttle plate to get from the idle and off-idle test points to the part-throttle and full throttle test points. We have determined that it is in going to the part-throttle and full throttle test points where much time could be saved and where greater speed in the movement of the carburetor throttle plate per degree of rotation of the stepping motor would be of definite advantage.

We at first tried the use of spring loaded regular spur gears with the holes drilled in offset positions. However, this proved completely unsatisfactory as the gears either would not stay together, or jammed up, rendering the apparatus controlling the carburetor throttle plate completely ineffective.

Further work on this problem led to the idea that elliptical cams would give us the desired mechanical advantage without the problems of the offset spur gears, and we tried a pair of eliptical cams tied together with a fine cable to drive the carburetor throttle linkage 53. This indeed, as shown by FIG. 12, gave us the advantage we were looking for, with very close control of the throttle plate and with the mechanical advantage we desired. For example, at idle condition where close resolution is required, if the stepping motor would change 10°, the position of the throttle linkage would change only 5°, or, in other words, for each degree of rotation of the stepping motor, the carburetor throttle plate would be moved one-half degree, while at or ear wide open throttle, for each degree of movement of the stepping motor, the throttle plate would be moved 2°The advantage of this from the previous description is obvious, as the movement between test points would be very rapid, and the test point at wide open throttle woukld be very rapidly reached.

The stepping motor has so far been assumed to be a standard stepping motor directly connected to the carburetor linkage 53. Such a stepping motor might be such as the type HS--50P3 Slo-Syn Stepping motor manufactured by the Superior Electric Company of Bristol, Connecticut. Such a stepping motor contains internal planetary gear which has a mechanical advantage of approximately 100 to 1. Whereas this stepping motor 42 rotates 1.8° for each pulse applied by the motor controller 79, the output from the planetary gear 105 rotates the throttle plate 0.018°. At maximum speed, Applicants' system could, therefore, operate 90° from idle to full throttle, in seventeen seconds. It can be seen that use of a planetary gear 105 which has a mechanical advantage of 20 to 1 will increase the speed of operation. However, this system, which rotates the throttle plate 0.09° for each pulse applied by the motor controller 79, does not have adequate resolution at idle and off idle flow points.

But, by using a motor controller 79 which causes the stepping motor in increment in half-steps, the stepping motor movement can be changed from 1.8° to 0.9 for each pulse of the motor controller. Such a motor controller is described in the *Sigma Stepping Motor Handbook* published in 1972 by Sigma Instruments, Inc. of Braintree, Massachusetts, starting at page 25, and is commercially available as Model No. 30003, manufactured by Scans Associates, Inc. of Livonia, Michigan. However, the use of the motor controller does not change the angular speed of the stepping motor, but only allows closer control of it.

Thus, we can now use a stepping motor 42 having an internal planetary gearset 105 with a 20 : 1 ratio.

The advantage of this motor controller and non-linear mechanical advantage from the previous description is obvious, as the resolution at idle flow points will be 0.022° per pulse, the resolution at full throttle will be 0.088 degrees per pulse, and the test point at full throttle would be rapidly reached.

While our system without the elliptical arrangement could go from idle to full throttle in 17 seconds, our new system with the nonlinear mechanical advantage of the elliptical gear arrangement could perform the same operation in 3.5 seconds. In other words, almost five times as fast. Saving this much time in high production carburetor test work indeed is a significant advance in the art.

In this system, the throttle stepping motor 42 is mounted on a frame member 87, which may, in turn, be mounted on a carburetor test stand 29. Drivingly connected to the shaft 88 of the stepping motor 42 is a clutch assembly 89. The clutch assembly is, in turn, connected to a first elliptical gear 90. This first elliptical gear 90 is drivingly engaged with a second elliptical gear 91 rotatably mounted on a shaft 92 carried by the frame member 87. Fixedly mounted to the gear 91 is an adaptor plate 93, on which is mounted a pin 94, such pin 94 would correspond to the stud 52 shown in FIG. 2, and would engage the carburetor throttle linkage 53 for movement of the carburetor throttle plate 60.

A modified version of this arrangement shown in FIG. 11 and FIG. 2 would have the stepping motor 42 and the clutch assembly 89 offset from each other instead of in line as shown in FIG. 9. In this case, the stepping motor and clutch would be drivingly connected by a pair of spur gears 95 and 96. The clutch 89 would have the elliptical gear 90 mounted on the opposite end of the shaft from the gear 96 and drivingly connected to the second elliptical gear 91, on which the stud 52 would be mounted. If required, as shown in FIG. 2, the stud 52 could be mounted on a separate crank 49.

A more graphic illustration of the mechanical advantage offered by the elliptical gears can be seen by referring to FIGS. 13 – 16, which are based on the graph shown in FIG. 12. FIG. 13 shows the relationship of the first elliptical gear 90, and the second elliptical gear 91, at their starting or carburetor throttle idle position.

FIG. 14 shows the two elliptical gears 90 and 91 at a position where the carburetor throttle plate has been opened but is still at a near idle condition. When the gear 90 has turned 30°, as shown at point A in FIG. 12, the gear 91 has moved only 15°, while in FIG. 15, as the gear 90 continues to move away from the carburetor throttle closed position, due to the elliptical shape of the gars, a mechanical advantage starts coming about in the movement of the gear 91. When the gear 90 has turned 45°, as shown at point B, the second elliptical gear has now come to a position 30° from its closed position. In other words, for gear 91 to move the first 15°, 30° of stepping motor rotation was required, or 2 degrees of stepping motor rotation equals one degree of throttle plate. The next 10 degrees of throttle plate opening took only 15 degrees of stepping motor rotation.

By referring to FIG. 12, by the time the stepping motor is moving from the 70° to 80° position, each degree of stepping motor rotation results in two degrees of throttle plate opening. Thus, the very fine resolution needed at idle is achieved at the same time, very fast movement of the throttle plate, where required, is provided.

There is, thus, provided an improved method and apparatus whereby the objects of the present invention and numerous additional advantages are attained.

We claim:

1. A carburetor throttle plate drive including a frame member, a stepping motor fixedly mounted to said frame member, a first non-linear driving means fixedly mounted to the shaft of said stepping motor, a second non-linear driven member rotatably mounted on said frame member in driving engagement with said driving means, and means mounted on said driven member adapted to drivingly but removably be connected to said carburetor to control the throttle plate thereof.

2. The device defined in claim 1l, wherein said driving means and driven member are in the form of elliptical gears.

3. The device defined in claim 1, wherein there is provided in additional to the apparatus previously described a clutch means having an input shaft and an output shaft, with said input shaft being fixedly connected to said stepping motor and said fist non-linear driving means fixedly mounted to the output shaft of said clutch instead of being directly mounted to said shaft of said stepping motor.

4. A driving means including a frame member, a stepping motor fixedly mounted to said frame member, a gear means fixedly mounted to the shaft of said stepping motor, a clutch means having an input shaft and an output shaft mounted to said frame member adjacent to said stepping motor, a second gear means mounted to the input shaft of said clutch and adapted to actively engage said first gear means, a first non-linear driving means fixedly mounted to the output shaft of said clutch, a second non-linear driven member rotatably mounted on said frame member in driving engagement with said first non-linear driving means, and a means mounted on said driven member adapted to drivingly but removably be connected to a carburetor to control the throttle plate thereof.

5. The device defined in claim 4, wherein said first gear means and said second gear means are both spur gears.

6. The device defined in claim 5, wherein said driving means and said driven member are both in the form of elliptical gears.

* * * * *

UNITED STATES PATENT AND TRADEMARK OFFICE

CERTIFICATE OF CORRECTION

PATENT NO. : 4,030,352

DATED : June 21, 1977

INVENTOR(S) : Richard L. Smith and Peter J. Mosher

It is certified that error appears in the above-identified patent and that said Letters Patent are hereby corrected as shown below:

Column 16, line 14, "claim 11" should be ---claim 1---.

Column 16, line 18, "additional" should be ---addition---.

Column 16, line 21, delete "fist" and insert ---first---.

Signed and Sealed this

*Twenty-ninth* Day of *November 1977*

[SEAL]

*Attest:*

RUTH C. MASON
*Attesting Officer*

LUTRELLE F. PARKER
*Acting Commissioner of Patents and Trademarks*